(12) United States Patent
Le Croller et al.

(10) Patent No.: US 9,169,015 B2
(45) Date of Patent: Oct. 27, 2015

(54) COUNTERMEASURE DECOY SYSTEM INTENDED TO BE MOUNTED ON AN AIRCRAFT

(75) Inventors: David Le Croller, Paris (FR); Jean-Luc Assouly, Fresnes (FR)

(73) Assignee: MBDA FRANCE, Paris (FR)

( * ) Notice: Subject to any disclaimer, the term of this patent is extended or adjusted under 35 U.S.C. 154(b) by 24 days.

(21) Appl. No.: 14/131,843

(22) PCT Filed: Jul. 9, 2012

(86) PCT No.: PCT/FR2012/000275
§ 371 (c)(1),
(2), (4) Date: Mar. 24, 2014

(87) PCT Pub. No.: WO2013/007890
PCT Pub. Date: Jan. 17, 2013

(65) Prior Publication Data
US 2014/0196597 A1   Jul. 17, 2014

(30) Foreign Application Priority Data

Jul. 12, 2011 (FR) .................................... 11 02194

(51) Int. Cl.
| | |
|---|---|
| *F41F 5/00* | (2006.01) |
| *B64D 1/02* | (2006.01) |
| *F41A 9/72* | (2006.01) |
| *F41F 3/06* | (2006.01) |
| *F41F 7/00* | (2006.01) |
| *F42B 12/70* | (2006.01) |

(52) U.S. Cl.
CPC ... *B64D 1/02* (2013.01); *F41A 9/72* (2013.01); *F41F 3/06* (2013.01); *F41F 5/00* (2013.01); *F41F 7/00* (2013.01); *F42B 12/70* (2013.01)

(58) Field of Classification Search
CPC ............. B64D 1/02; B64D 1/04; B64D 1/10; B64D 1/12; F42B 12/70; F42B 12/36; F42B 12/365; F42B 12/367; F41F 5/00; F41F 3/06; F41F 3/065; F41F 7/00; F41A 9/72
USPC .................... 89/1.51, 1.58, 1.59, 1.54, 37.16; 102/388, 385, 504, 505
See application file for complete search history.

(56) References Cited

U.S. PATENT DOCUMENTS 2,979,991 A * 4/1961 Buschers et al. .................. 89/1.7
3,547,000 A * 12/1970 Haberkorn et al. ............ 89/1.51
(Continued)

FOREIGN PATENT DOCUMENTS

FR           2906359         3/2008

*Primary Examiner* — Joshua Freeman
(74) *Attorney, Agent, or Firm* — Duane Morris LLP; J. Rodman Steele, Jr.; Gregory M. Lefkowitz

(57) ABSTRACT

In order to allow decoy projectiles (6) to be launched with optimal quality of flight, the projectiles respectively include external cylindrical bodies (80) which are dimensionally identical, housed in the tube and each having a deployable-fins (9) aerodynamic stabilization device, that adopt a folded position inside the body when the projectile is in the tube, and a deployed position outside of the tube. To achieve that, the system includes a projectile ejection system (8), with an axial passage (12), arranged fixedly as a continuation of the tube, at the opposite end to the advance mechanism, and containing, in succession, after the control mechanism, the projectile (6) that is to be ejected by a controllable ejection device (25) connected to the module.

19 Claims, 5 Drawing Sheets

(56) References Cited

U.S. PATENT DOCUMENTS

| | | | |
|---|---|---|---|
| 4,208,949 A * | 6/1980 | Boilsen | 89/1.801 |
| 4,256,012 A * | 3/1981 | Cowart et al. | 89/1.816 |
| 5,249,527 A * | 10/1993 | Schwind | 102/354 |
| 5,267,501 A * | 12/1993 | Shillig | 89/1.51 |
| 6,324,955 B1 * | 12/2001 | Andersson et al. | 89/1.11 |
| 6,752,060 B1 * | 6/2004 | Griffin | 89/1.817 |
| 6,779,754 B2 * | 8/2004 | Hellman | 244/3.27 |
| 6,857,596 B1 * | 2/2005 | Carlson | 244/1 TD |
| 6,980,152 B2 * | 12/2005 | Steadman et al. | 342/14 |
| 7,089,842 B1 * | 8/2006 | Herbage | 89/1.8 |
| 7,278,416 B2 * | 10/2007 | Larcheveque et al. | 124/72 |
| 8,205,536 B2 * | 6/2012 | Fisher | 89/1.11 |
| 2003/0071164 A1 * | 4/2003 | Carlson et al. | 244/1 TD |
| 2003/0192992 A1 | 10/2003 | Olsen | |
| 2004/0200382 A1 | 10/2004 | Zatterqvist et al. | |
| 2006/0027380 A1 * | 2/2006 | Stevenson et al. | 169/45 |
| 2009/0193962 A1 * | 8/2009 | Zachrisson | 89/1.801 |
| 2010/0326263 A1 * | 12/2010 | Stevenson | 89/1.51 |
| 2012/0055949 A1 * | 3/2012 | Stenfelt et al. | 221/1 |
| 2012/0104174 A1 * | 5/2012 | Zatterqvist | 244/137.1 |
| 2013/0167711 A1 * | 7/2013 | Zatterqvist | 89/1.56 |

\* cited by examiner

COUNTERMEASURE DECOY SYSTEM INTENDED TO BE MOUNTED ON AN AIRCRAFT

CROSS-REFERENCE TO RELATED APPLICATIONS

This application is a §371 national stage entry of International Application No. PCT/FR2012/000275, filed Jul. 9, 2012, which claims priority to French Patent Application No. 1102194 filed Jul. 12, 2011, the entire contents of which are incorporated herein by reference.

The present invention relates to a counter-measure decoy system designed to be mounted more particularly, but not exclusively, on an aircraft such as an aeroplane or a helicopter.

It is known that, in order to respond to the different enemy threats that a fighter plane, for example, has to address, said fighter plane is equipped with, in addition to conventional offensive weapons systems, defensive counter-measure decoy systems, which are adapted to the different particular threats. Therefore, faced with enemy missiles having electromagnetic, infrared or other homing devices, decoy systems specific to these threats must be installed on the fuselage and/or the wings of the aeroplane.

It is therefore understood that numerous locations are necessary for mounting decoy systems, which is detrimental not only to the mass of the craft but also in terms of the ability to carry other items of equipment (weapons, tanks, etc.). Furthermore, as these decoy systems are structurally and operationally different as a function of the objectives to be achieved and missions to be carried out, they therefore require specific studies, developments and manufacturing processes, which further increases the costs of these decoy systems that are to be mounted on the aircraft.

Moreover, the projectiles that are used in these systems often have different external shapes, which are heterogeneous and not particularly aerodynamic, as a function of their objective, which does not allow them to have or to maintain suitable quality of flight after they are ejected from these systems, for example, in order to keep them in the aerodynamic slipstream of the aeroplane or close to the slipstream depending on the counter-measure devices that are present.

For example, one of the decoy systems present on aeroplanes is a system, referred to as a chaff dispenser, comprising projectiles with a metal counter-measure device and forming, once jettisoned in packets or containers, an electromagnetic cloud designed to attract an enemy missile with an electromagnetic homing device.

Such a system comprises juxtaposed tubes, fixed by a support frame or pod to the structure of the aircraft and housing, inside each tube, one after the other, the counter-measure projectiles designed to be launched and a control mechanism for advancing said projectiles inside each tube and for releasing them from said tube.

The object of the present invention is to overcome the aforementioned disadvantages and said invention relates to a counter-measure decoy system, the design of which particularly allows optimum quality of flight of the projectiles to be ensured and the requirements for these different counter-measure devices to be unified.

To this end, the counter-measure decoy system designed to be installed on an aircraft and of the type comprising:
counter-measure projectiles;
at least one tube for receiving said counter-measure projectiles in series and for the successive controllable launch of said projectiles; and
a control mechanism for advancing said projectiles inside said tube, is noteworthy in that, according to the invention:
said counter-measure projectiles respectively comprise dimensionally identical external cylindrical bodies, housed inside said tube and each having a deployable-tail-fin aerodynamic stabilisation device, assuming a folded position inside said tube and a deployed position outside of said tube, and
said system comprises a projectile ejection module, with an axial passage, fixedly arranged in the extension of said tube, opposite said advance mechanism, and successively containing, after said control mechanism, said projectile to be ejected from said tube by a controllable ejection device connected to said module.

Therefore, owing to the invention, projectiles (decoys) are obtained that are kinematic owing to the cylindrical shape of the body and the associated tail-fins, which provides them with optimum quality of flight as soon as they exit the module. Indeed, the cylindrical bodies with tail-fins rapidly stabilise in the aerodynamic slipstream. Furthermore, the ejection module at the end of the tube ensures the successive launch of identical projectiles.

According to the selection that is made, the cylindrical-bodied projectiles arranged inside the tube and the module can have counter-measure devices that are identical or different for at least two of said projectiles. Therefore, owing to the invention, it is thus possible to consolidate, within the same decoy system, projectiles having identical counter-measure devices, but also projectiles having different counter-measure devices thus adapted to a plurality of specific threats. In this case, this allows the protection requirements of the aircraft to be unified in these defensive systems and for only one location on the aircraft to be used.

Such a common system clears the locations occupied by other previous specific decoy systems, which eliminates the costs of developing each of said systems, reduces the mass and/or allows other equipment to be carried. A single system therefore can be used to launch, if required, decoys with different aims so as to address the numerous possible types of threats.

According to one embodiment, the counter-measure device of one of the projectiles is of the active electromagnetic type, which enables threats having electromagnetic homing devices to be efficiently countered.

According to a further embodiment, the counter-measure device is of the infrared type, which enables threats having infrared homing devices to be efficiently countered and, more particularly, those with homing devices having kinematic infrared counter-measure counter processing and small field homing devices.

Advantageously, in addition to the tail-fins that enable it to be stabilised about the aircraft once it is ejected, the projectile can be equipped with a propulsion unit housed inside the body, which particularly allows it to remain for a sufficient length of time in the immediate vicinity or to be placed in front of the aircraft.

Furthermore, said tube for receiving projectiles is at least arranged approximately parallel to the longitudinal axis of the aircraft. The ejection of the projectiles from the system by means of the module is then carried out in the aerodynamic slipstream.

In one particular embodiment, said projectiles with external cylindrical bodies are mounted in identical respective support cradles, which are housed inside said tube and are laterally open, and the ejection module with an axial passage for receiving the cradle carrying the associated projectile has a lateral opening through which the projectile is ejected from its cradle by the ejection device.

In this case, the cradles with their projectiles, which are of identical shape and size, are housed, without particular adaptation, inside the tube of the system, which advantageously can be that of a conventional chaff dispenser system.

The module then ensures the successive launch of the projectiles from their respective cradles and this takes place, perpendicular to the aerodynamic slipstream whilst remaining parallel thereto, due to the fact that the tube (and therefore the projectiles) is substantially parallel to the longitudinal axis of the aircraft, i.e. parallel to the slipstream. This, in addition to the tail-fins that deploy once free from the module, allows rapid and optimum stabilisation of each projectile ejected from its cradle, in relation to the aeroplane, and a reduction in drag, which are two essential conditions for guaranteeing the capture of the enemy homing device.

In one preferred embodiment, in addition to the relevant counter-measure device and the deployable tail-fins downstream of the body, a chamber associated with the ejection device of the cradle, a locking mechanism between the body and the cradle and an electrical connector for the firing orders and other operational data of the system are located inside the body common to each projectile.

Even though it is conceivable that the device is of the mechanical, fluid type, etc., said device for ejecting each projectile is preferably of the pyrotechnic type and is arranged either in the cradle or in the projectile in order to radially eject said projectile through the lateral opening of the module. For example, the direction of ejection of the projectile is in a range of more or less 25° in relation to the horizontal plane of the aircraft.

In a preferred embodiment, the deployable tail-fins of the projectile are in the form of at least two vanes. These are housed in lateral slots of the cylindrical body and can be kept in a folded position in the cradle by a rotary ring connected to the body and surrounding the vanes and, following the ejection of the projectile and under the action of a flexible resilient element, the ring rotates in order to locate its lateral openings opposite the slots and cause the vanes to change from the folded position to the deployed position.

It is also conceivable that the tail-fins are manufactured from a shape-memory alloy assuming a folded position conforming to the cylindrical body and a deployed position once ejected from the module.

In particular, position retention means are also provided between the cradle and the ejection module, with axial and transverse immobilisation of the cradle in relation to the module.

The figures in the appended drawings will provide an understanding of how the invention can be produced. In these figures, identical reference numerals designate similar elements.

FIGS. 3A to 3D schematically show examples of identical projectiles with different counter-measure devices.

Figure 4:
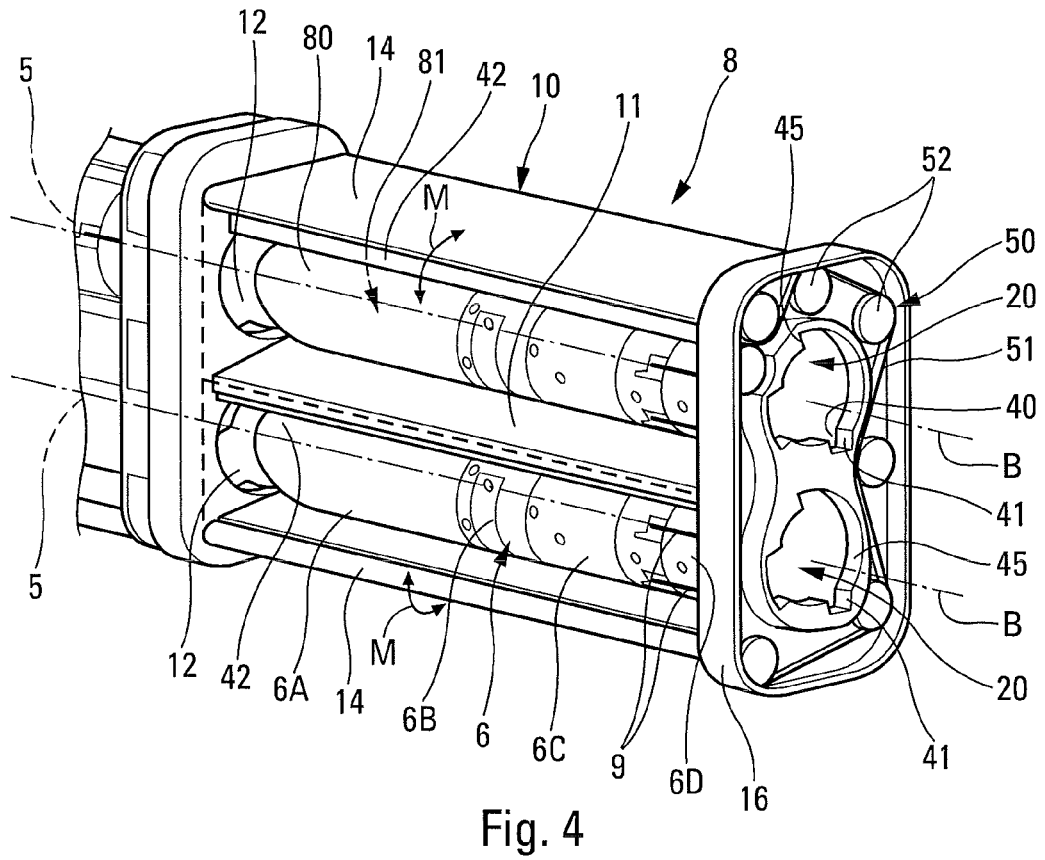

FIG. 4 is an enlarged perspective view of the ejection module of the decoy system according to the invention.

Figure 5:
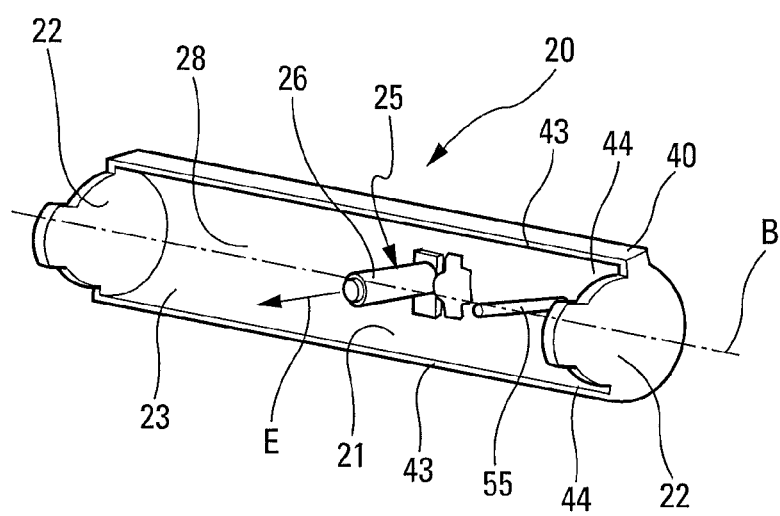

FIG. 5 is a perspective view of a projectile support cradle.

Figures 6, 7:
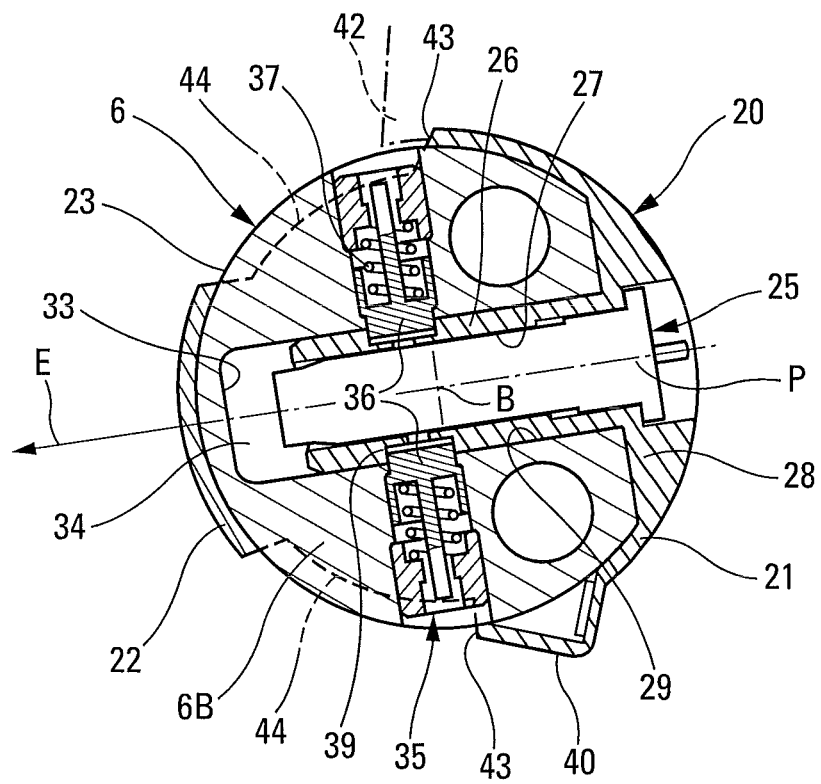

FIG. 6 is a cross-section of the cradle and of the associated projectile showing locking mechanism therebetween and the projectile ejection device.

FIG. 7 is a partial and cutaway perspective view of the ring for retaining the tail-fins of each projectile in the folded position.

Figure 8:
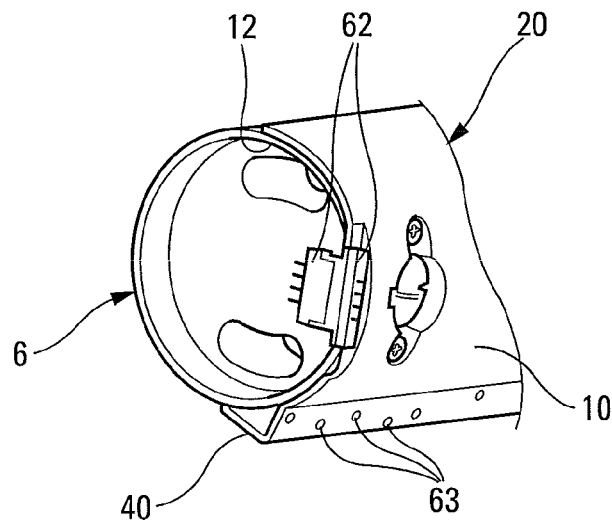

FIG. 8 is a partial schematic perspective view of the connectivity between the cradle, the projectile and the module.

Figure 9:
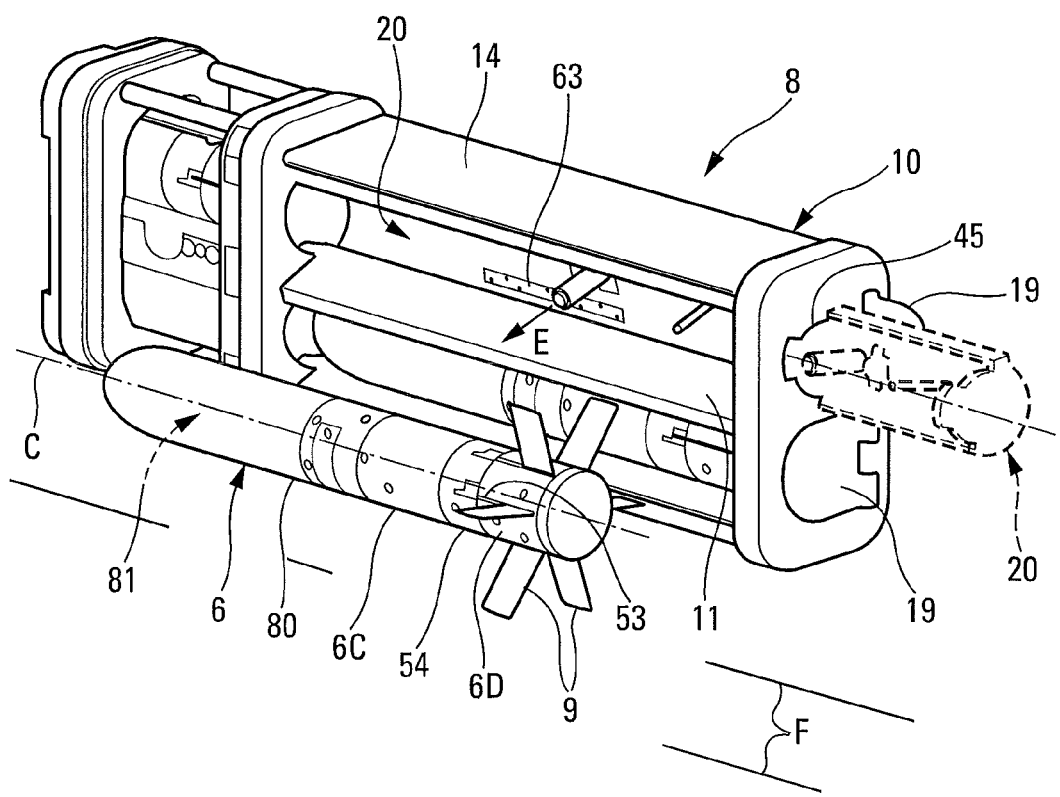

FIG. 9 is a schematic perspective view of the separation and the launch of a projectile from the corresponding cradle of the module and the exit of said projectile from the cradle of said module.

Figure 1:
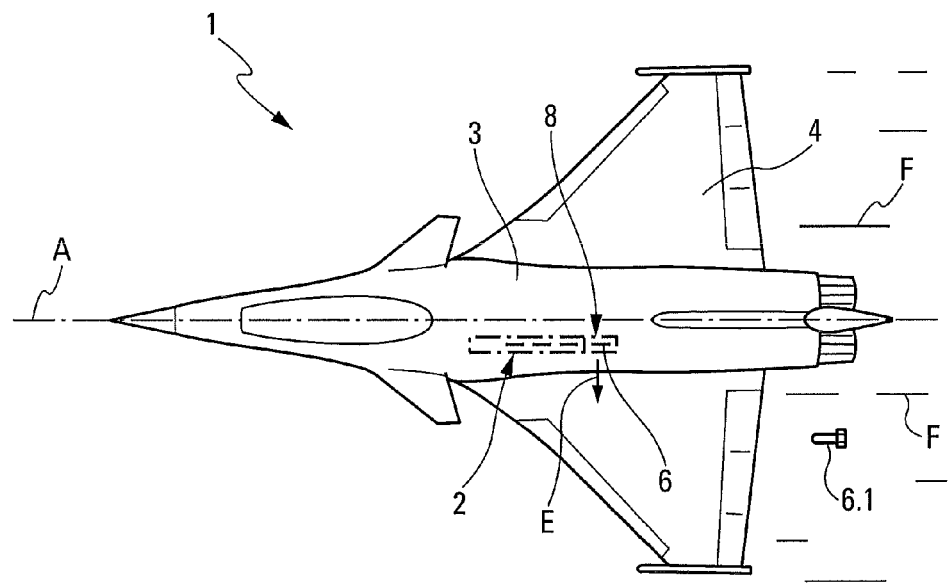
FIG. 1 is a plan view of an aircraft equipped with a decoy system having counter-measure projectiles according to the invention.

As can be seen in FIG. 1, the aircraft, such as a fighter plane 1, is equipped with a counter-measure decoy system 2, which is schematically shown by the dot and dash lines and fixed, via a suitable support frame or pod (not shown) under the fuselage 3 of the aeroplane. The longitudinal axis A of said aeroplane is also indicated, as is the aerodynamic slipstream between the aeroplane and the air, shown by the arrows F. Of course, the system can be located in any other possible location on the aeroplane.

In order for the aeroplane 1 to be able to address the various threats previously described, the projectiles 6 mounted in the system 2 can have different counter-measure devices capable of covering the numerous threats that exist from various sources (electromagnetic, infrared homing devices, etc.), which therefore allows the use of just one system 2 for launching these projectiles 6. However, the projectiles can have the same counter-measure device or any combination of different counter-measure devices. In order to achieve this, it is particularly worthwhile, according to the invention, for the different projectiles to be made common so that they can be launched from this system 2 and, to this end, for them to be designed to have the same external dimensions. They thus comprise the same external cylindrical body 80 of axis C, inside which different parts are provided, as will be seen in greater detail with reference to FIGS. 3A to 3D, and in particular the different counter-measure devices 81. In addition, each cylindrical body 80 is provided with a rear deployable tail-fin device 9 allowing the projectile, once launched, as will be seen hereafter, to achieve aerodynamic stability in the slipstream and, therefore, quality of flight that is suitable for its mission.

The decoy system 2 therefore can be produced on the basis of a conventional chaff dispenser that comprises, in the embodiment shown in FIGS. 2 and 4-9, two juxtaposed cylindrical tubes 5 connected to the support cradle and inside which the projectiles 6 are successively housed for decoying the enemy threats, and control mechanisms 7 for advancing the projectiles inside the tubes.

Figure 2:
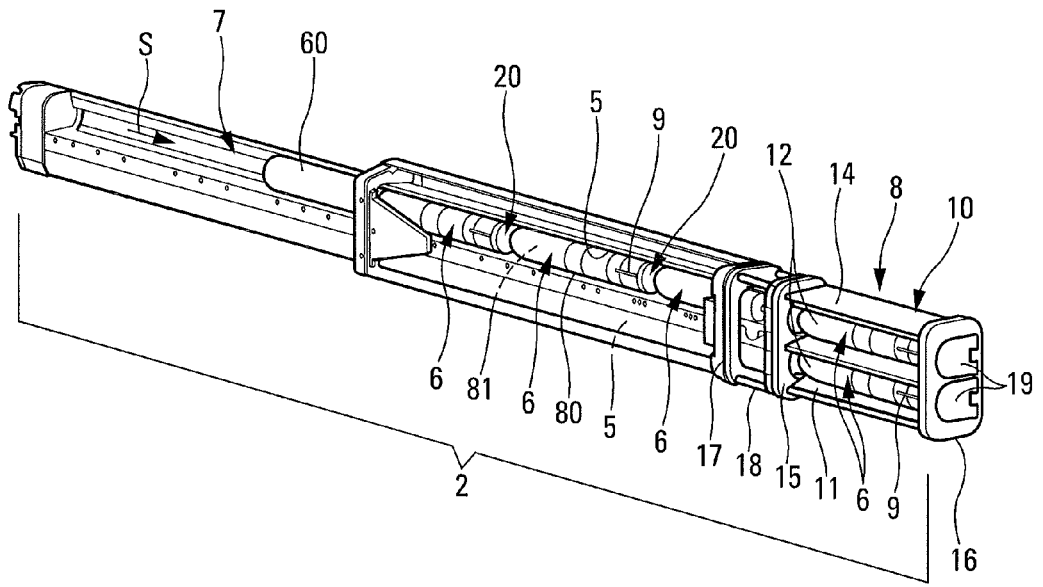
FIG. 2 shows, as a partial cutaway perspective view, an embodiment of the system of FIG. 1 containing the counter-measure projectiles.

In order to use the projectiles 6 having counter-measure devices 80, which can all be different, the system 2 comprises, in this embodiment, support cradles 20 for the projectiles housed inside the tubes and which are laterally open, and a module 8 for ejecting projectiles brought to the end of the tubes. Furthermore, as can be seen in FIGS. 1 and 2, the decoy system 2, which is of elongated shape due to the cylindrical tubes 5 and the extension of the control mechanisms 7 and of the module 8, is fixed substantially parallel to the longitudinal axis A of the aeroplane, and the ejection of each projectile 6 is designed so that it is orthogonal (according to the arrow E) to the axis A with the projectile 6 arranged in the aerodynamic slipstream F, i.e. parallel thereto, as will be seen hereafter.

When the system 2 is installed on the aeroplane, the ejection module 8 is located at the rear or downstream of the system so that the projectiles 6 exit the module with the o give-shaped tip of the body 80 in the slipstream F, turned towards the front of the aeroplane and the tail-fins 9 in the opposite direction. A previously launched projectile 6.1 is shown in the aforementioned configuration in FIG. 1.

With the system 2 arranged as such in the axis A of the aeroplane, and as such an orthogonal ejection is made possible owing to the individual cradles 20 and the ejection module 8, each projectile 6 is directly oriented in the aerodynamic slipstream F with reduced drag and optimum stability by means of the deployed tail-fins. Of course, the ejection of the cylindrical-bodied projectiles could occur in the axis of the one or more tubes of the system, parallel to the longitudinal axis A of the aeroplane.

The module 8 thus acts as a single firing interface for the successive ejection of the projectiles contained in the storage tubes 5.

Before providing a detailed description of the module, the cradles and devices, the mechanisms and other items of the system 2, reference first will be made to the projectiles 6 having different counter-measure devices 81 capable of being placed on board the system.

The projectiles 6 that are schematically shown in FIGS. 3A to 3D, and which are designed to be mounted in the individual cradles, each comprise a plurality of distinct parts. Therefore, the inside of the cylindrical body 80 common to each projectile 6 is composed of different distinct parts such that, from front to back of the body, there is a part 6A in which the required counter-measure device 81 is particularly located, a part 6B in which the ejection device 25 (FIG. 6) of the projectile and the locking mechanism 35 thereof is particularly located, a part 6C in which the energy source 32 of the projectile is particularly located, supplying its various components with power, and a part 6D in which the tail-fins 9 are located.

Figure 3A:
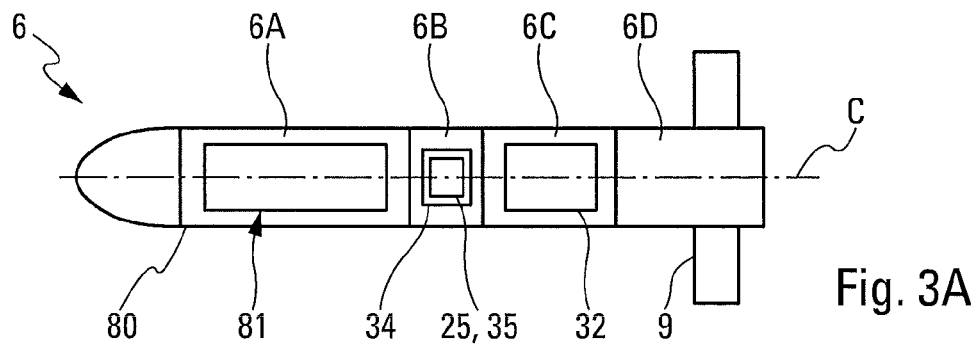

The first projectile 6, shown in FIG. 3A, is designed to counter threats from electromagnetic homing devices.

In this case, it comprises, in part 6A of the body 80, a counter-measure device 81 including a system for listening to the threat, for analysing and for directly generating the jamming waveform JW. The device 81 can comprise an inertial unit that allows the speed variations of the decoy to be known in order to authorise the system for generating the JW to synthesise the suitable modes. A computer is associated with the unit.

Part 6B mainly comprises the combustion chamber 34 of the ejection device 25 of the projectile, which is thus of the pyrotechnic type and is supported by the corresponding support cradle, as will be seen hereafter. Part 6B also includes the electrical connectivity required for the proper operation of the components that constitute the projectile.

With regard to part 6C of the projectile of FIG. 3A, it comprises the energy source 32, which is a battery, for example, whereas part 6D particularly includes the tail-fin aerodynamic stabilisation device 9 of the projectile, which change from the folded position to the deployed position, as will be seen in greater detail hereafter.

Figure 3B:
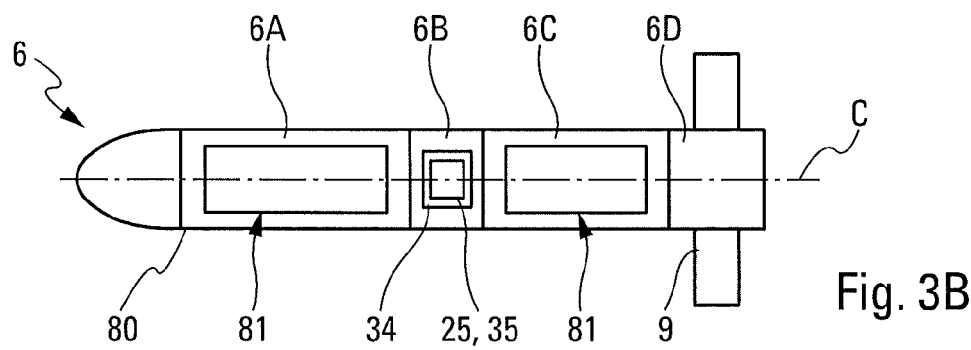

The second projectile 6, shown in FIG. 3B, is designed to counter threats having infrared homing devices and particularly those having counter-measure counter processing and those having small fields.

The counter-measure device 81 located in part 6A of the body 80 comprises one or more pyrotechnic charges providing, when they are initiated, the required infrared emission. The charge in the projectile can be a charge with a maximum infrared signature, a multi-spot charge that confuses the homing device of the threat, a pyrophoric charge creating an extended infrared signature or a masking effect, a smoke generator that masks the aeroplane, a charge emitting in the visible light range for driving forces, or an electro-optical charge for masking the firing aeroplane from enemy fire control. These charges are provided with pyrotechnic delays allowing them to be switched on at the required moment.

The ejection device 25 of the projectile and the mechanism 35 for locking said projectile to the cradle, as well as the electrical connectivity, are located in the chamber 34 of part 6B of the projectile, as in the case of the preceding projectile. A further pyrotechnic charge is arranged in part 6C, which pyrotechnic charge may or may not be different to that located in part 6A. Finally, tail-fins 9 for the aerodynamic stabilisation of the projectile are provided in the rear part 6D, which tail-fins are identical to those of the preceding embodiment.

Figure 3C:
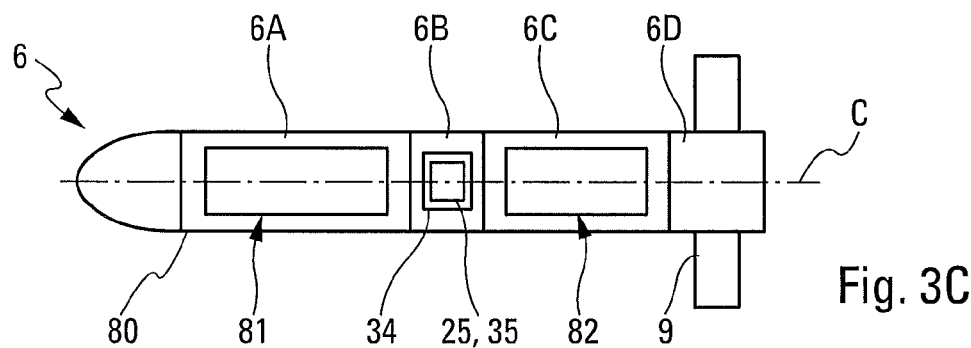

The third projectile 6, shown in FIG. 3C, is designed to emit an infrared signal of the type for countering infrared homing devices, and more particularly those with kinematic counter-measure counter processing favouring tracking on a leading edge.

In order to achieve this, the counter-measure device 81 is located in the front part 6A of the cylindrical body 80 in the form of one or more pyrotechnic charges providing the infrared emission, such as those described with reference to the second projectile. Pyrotechnic delays are also provided and the required moment for initiating the charge can be optimised by programming the mission on the ground and particularly as a function of the direction of arrival of the threat.

The chamber 34, the ejection device 25, the lock 35 and the electrical connectivity equipping the preceding projectiles are located in part 6B, whereas a miniaturised propulsion unit 82 is arranged in part 6C, which propulsion unit allows the projectile 6, after it is ejected from the cradle, to remain for a sufficient length of time in the immediate vicinity or to be placed in front of the aircraft and address the threat. It is also possible for a device to be provided for controlling drag in order to maintain a constant thrust/drag ratio and thus optimum decoy efficiency in the entire flight envelope of the aeroplane. Finally, the rear part 6D comprises the deployable tail-fins 9.

Figure 3D:
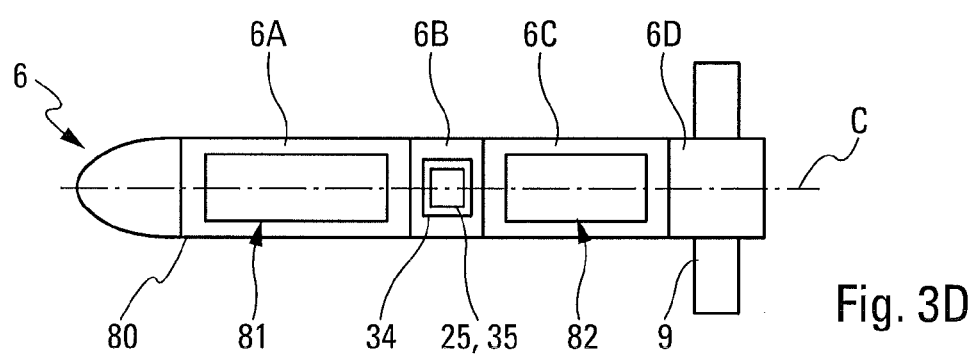

The fourth projectile 6, shown in FIG. 3D, is designed to carry packets of chaff that are set into strips in order to constitute, once jettisoned, an electromagnetic cloud around the whole of the aircraft, and to decoy the relevant threats.

Furthermore, the front part 6A of the cylindrical body 80 comprises the counter-measure device 81 constituted by packets of chaff in one or more strips, similar to the packets inserted in present chaff dispensers. Pyrotechnic or electrical delays can be provided for switching on packets of chaff at a required and programmed moment and for distributing said packets. A miniaturised propulsion unit 82 is also located in part 6C of the cylindrical body, in this case also in order to allow the decoy projectile to be placed at the front of the aeroplane.

Moreover, the chamber 34, the ejection device 25, the lock 35 and the electrical connectivity are provided in parts 6B and 6D of the projectile and the deployable tail-fins 9 are provided in part 6D.

Other projectile designs are conceivable.

The structure and the operation of the decoy system 2 will now be described together with its identical projectiles, which can have different decoy functions.

In the embodiment shown in FIG. 4, the module 8 comprises a body 10 that is fixedly connected in the extension of the two juxtaposed tubes 5 by having a substantially parallelepiped shape, corresponding to that of the tubes in their support frame, and which has a lateral opening 11 through which the projectiles can be ejected. The body 10 has two parallel axial passages 12 arriving, after the fixation of the module 8, in the respective co-axial extension of the tubes 5.

These passages are surrounded by a lateral side 14 that can be opened so as to reveal the lateral opening 11, as will be seen hereafter.

Structurally, the body 10 is terminated by two transverse end sides 15 and 16, one of which, 15, is connected directly to the facing transverse side 17 terminating the two tubes by means of spacers 18 for bearing the ejection forces, the other of which, 16, terminates the module 8 by being provided with movable articulated flaps 19 which form a trapdoor and are spontaneously brought into the closed position protecting the inside of the module from the external environment. The two axial passages 12 extend along the length of the body and communicate with the two tubes 5 on one side and are closed on the other side by the flaps 19.

Advantageously, the projectiles 6, which are of identical external shape due to their cylindrical body 80, are respectively housed in the individual cradles 20, which cradles are mounted in the juxtaposed storage tubes 5 and in the module 8. In the example shown in FIG. 2, the identical tubes 5 each comprise three projectiles arranged in series, and a fourth projectile is already housed in the corresponding axial passage 12 of the module, ready to be fired.

Such a launch system 2 thus comprises eight identical projectiles. Clearly, it can have a single tube or more than two tubes with different capacities for carrying projectiles without departing from the scope of the invention. With regard to the ejection module 8, it comprises a number of passages that corresponds to the number of tubes, with a single projectile being supplied in each passage 12 by means of the advance control mechanism 7 located on the other side of the tube, and which will be described hereafter. Therefore, a series of four projectiles is located in each corresponding tube and passage of the module, which projectiles can have different counter-measure devices. The tubes comprise, for example, two identical series of projectiles 6. It is thus easy to understand that any possible combination of counter-measure projectiles can be arranged in the tubes where, for example, two or more of said projectiles can be identical in that they have the same counter-measure device, and the other projectiles have different devices, etc., or all of said projectiles can be identical.

The support cradle 20, schematically shown in FIG. 4 without the projectile, comprises a cylindrical envelope 21 of axis B, covering an angular sector that is at most diametrical and terminated by two transverse end sides 22. The distance separating the two sides 22 substantially corresponds to the length of the projectile 6 between its upstream tip and the downstream tail-fin, and the diameter of the reception envelope 21 corresponds to the external diameter of the cylindrical body 80 of the projectile 6. As the envelope only covers an angular sector below 180°, the projectile 6 can be easily mounted via the lateral opening 23 left by the cradle and subsequently can be ejected from said cradle through the lateral opening 11 of the body of the module, as will be seen hereafter.

Each cradle 20 comprises, in addition to receiving the projectile, a plurality of other functions such as, in particular, retaining and indexing the cradle in the corresponding passage of the module and the tube in a suitable angular position, locking the projectile in the cradle and ejecting the projectile from the cradle.

The projectile ejection device 25 is, in this example, of the pyrotechnic type, is controllable and is integrated in each cradle 20. As can be seen in FIGS. 5 and 6, it is housed in a cylindrical cavity 27 of a radial appendage (or protuberance) 26 protruding from the base 28 of the envelope and is electrically connected to a control (not shown). Part 6B of the projectiles 6 engages in this protruding appendage 26. In order to achieve this, a blind hole 29 is made in this part 6B of the projectile, and defines, between the base 33 of the blind hole 29 and the appendage 26, the combustion chamber 34 for the gases coming from the pyrotechnic device in order to allow the projectile to be ejected in a properly defined direction (arrow E) corresponding to the axis P of the cylindrical appendage 26, and which passes through the centre of the lateral opening 23 of the cradle.

A locking mechanism 35 is provided to hold the projectile in position on the cradle 20 when the pyrotechnic device 25 is inactive. FIG. 6 shows that said locking mechanism is composed of two locking pins 36 which are co-axially aligned and diametrically disposed either side of the appendage 26, perpendicular to the axis P. Structurally, the pins 36 are symmetrically subjected to the action of springs 37 in abutment, on the opposite side of the pins, against rings 38 fixed to the mid-part 30 of the projectile. These pins 36 thus engage, under the action of the springs 37, in recesses 39 provided in the appendage 26 and thus lock the projectile 6 in the cradle 20.

Furthermore, as shown in FIGS. 4, 5 and 6, each cradle 20 comprises, on the periphery, a longitudinal protuberance 40 forming a tab, which engages in a corresponding reception groove 41 provided in the axial passage 12 of the module and the tube 5. In this way, the cradle and its projectile are oriented in a suitable angular position.

Provision is also made for retaining the cradles 20 in transverse and axial positions in the ejection module 8. For example, two bent parallel edges 42 are provided along the length of the body 10 delimiting the axial passages 12, as shown in FIGS. 4 and 6, and acting as bearing zones for each relevant worked edge 43 of the envelope 21 of the cradles, providing the transverse retention thereof perpendicular to their longitudinal axis B.

With regard to the axial retention, along this longitudinal axis, of each cradle 20 relative to the corresponding axial passage 12 of the body, this can be obtained by a pivoting flap (not shown) provided on the transverse side 16 in order to axially block the cradle or free the passage so that it can exit. Also, in this example, the axial retention can be achieved by the difference in transverse shapes between the cradle 20 and the projectile 6, which prevents the cradle from axially exiting as long as the projectile is located therein.

Indeed, the transverse sides 22 of the cradle 20 are of circular shape with cut-outs 44 and, when they are introduced into the axial passage and after the ejection of the projectile, as will be seen hereafter, must pass (FIGS. 4, 5, 9) through a suitable corresponding cut-out 45 provided in the transverse sides 15 and 16 of the module (the side 16 together with its cut-outs 45 is particularly visible in FIG. 3). The transverse section of the projectile held between the two transverse sides 22 also can be of circular shape that is larger than the cut-outs 44 of the sides 22 of the cradle (as shown by the dashed line for the cut-outs 44 in FIG. 6) and, therefore, larger than the cut-out 45 of the sides 15, 16 of the body, so that the rear of the projectile 6 is applied, via its points that are larger than the cut-outs, as an axial abutment against the transverse side 16 of the body. In this way, any axial movement of the cradle 20 relative to the body 10 whilst the projectile 6 is located in the cradle is prevented.

The ejection of the projectile 6 is governed by the previously defined angular indexing and by the orientation of the radial appendage 26.

Furthermore, in this example, the ejection axis E (axis P of the appendage) forms an angle of 20° relative to the horizontal plane of the aeroplane so as to eject the projectile under the aeroplane. Of course, the angle can be different depending on the projectile that is used, the location of the system, etc. and can be in a range of more or less 25° relative to the horizontal plane of the aeroplane, below or above the plane.

Moreover, in order to limit the dispersions of the projectile during ejection, it is preferable for the centre of thrust of the pyrotechnic device 25 to be located at the centre of gravity of the projectile 6 to be ejected.

In addition, as shown in FIG. 4, it can be seen that the lateral side 14 of the module is movable and is open to reveal the projectiles to be ejected and thus define the lateral ejection opening 11. In order to achieve this, the lateral side 14 is displaced by a belt-pulley or chain-sprocket or gear 51-52 drive mechanism 50 housed in the downstream transverse side 16 of the module 8. Controlling this mechanism 50 involves, depending on the given direction (arrows M), opening the side 14 in the same way as a rigid rotary flap to define the opening 11 as is the case in FIG. 4, or closing the side blocking the opening 11 when the module 8 of the launch system 2 is inactive. The side can also be in the form of a flexible curtain, for example, made from composite material.

As the projectiles 6 are equipped with the rear tail-fin aerodynamic stabilisation device 9, said tail-fins need to be kept, retracted, in the folded position when the projectiles are in their respective cradles 20, which prevents problems of friction in the tubes, and the tail-fins need to be released so that they change to the deployed position upon ejection of the projectiles 6 so that said projectiles can be stabilised.

In order to achieve this, as shown in FIG. 7, the tail-fins 9 are vanes and, in this example, there are six vanes (of course, this number can be different and is at least equal to two) which are evenly angularly distributed about the circular rear part 6D of the body 80 of the projectile. They are held in the folded position in radial slots 53, provided in part 6D, by a rotary ring 54 surrounding said part. This ring 54 is immobilised in the illustrated position (tail-fins 9 folded) by a radial spindle 55 protruding from the base 28 of each cradle 20 (FIGS. 5 and 7) and parallel to the appendage 26 of the pyrotechnic device 25. This spindle 55, during assembly of the projectile, passes through the ring 54 and the rear part of the projectile. The ring also has openings 56 that are designed to face the slots 53, following the angular rotation of the ring 54 under the action of a spring 57 that is provided radially between a recess 58 of the rear part 46 and the ring when the projectile 6 is ejected having left the spindle 55 and thus the cradle 20.

With regard to the mechanisms 7 for controlling and advancing projectiles 6, they are each of the piston type 60 (or with a rack and pinion motor), which piston slides in the respective tube 5 under the action of a controllable fluid source communicating with the chamber of the tube 5 and shown by an arrow S in FIG. 2. The simplicity of manufacturing these mechanisms is noteworthy, as it provides significant operating reliability.

In addition, when these mechanisms 7 are successively activated, to allow the aligned projectiles to advance, the cradle 20 of the module 8 from which the projectile has been ejected is driven out of the axial passage and passes through the flap forming a trapdoor 19, provided on the transverse side 16.

Furthermore, in order to ensure the correct operation of the system and to control the ejection of the projectiles, each cradle 20 is equipped with an electrical connector. In particular, as is schematically and partially shown in FIG. 8, a first electrical connection by connectors 62 is provided between the connector connected to the base 28 of the envelope 21 of each cradle and the connector that is present on the projectile, particularly to control the ejection device 25 located on the mid-part of the projectile. This connection becomes operational when assembling the projectile in the support cradle 20.

A second electrical connection is provided between each cradle 20 and the body 10 of the module. This connection is made each time a cradle 20 slides into place with the associated projectile in the relevant axial passage 12 of the body of the ejection module 8. It is also used to establish the electrical connection with the various relevant electrical items of equipment of the projectile 6 and to thus guarantee the correct positioning of the cradle in the module.

In this example, the second connection comprises telescopic contacts (not shown in the figures) provided in the side of the body 10 of the module delimiting each axial passage 12 and cooperating with conducting points or studs 63 provided in correspondence on the cradle, for example, along the longitudinal protuberance 40 of each cradle, as can be seen in FIG. 7. In order to guarantee the connection between the studs 63 and the corresponding connector 62 of the cradle, a flexible circuit (not shown) is integrated in the cradle and connects the studs to the connector.

It is also noteworthy that, as "reloading" of the cradles 20 in the module 8 is carried out in a linear manner, the contacts and the points 63 are distributed on a plurality of parallel lines and are also separated by a variable pitch. This ensures that no electrical line is closed during the translational movement of the cradle in the passage of the module. In the terminal position (cradle engaged in the module), the lines are all closed, which, in terms of safety, is essential when using a pyrotechnic ejection device.

The operation of the launch system 2, as described above, does not involve significant problems and occurs as follows.

As can be seen in FIG. 2, the tubes 5 and the axial passages 12 of the ejection module 8 are considered to contain the cradles 20 with the cylindrical bodies 80 of the projectiles 6, which have particularly distinct counter-measure devices 81, such as those previously described. The launch relates, for example, to the projectile 6 located in the axial passage 12, referred to as an upper passage, of the module 8.

The various connections are established. The movable lateral side 14 of the module moves under the control of the drive mechanism 50, which exposes the lateral opening 11, as shown in FIG. 4. Even though, in the representation shown, the open lateral side 14 reveals the two projectiles, it could only show the upper projectile.

When the pyrotechnic device 25, as shown in FIG. 6, is fired following a triggering command, the propulsion gases reach the chamber 34 and then the locking pins 36, which are pushed away from the recesses 39 of the radial appendage 26. This causes the compression of the springs 37 bearing against the rings 38. In this way, the projectile 6 is released from the support cradle 20 and is radially ejected therefrom along the arrow E, the direction of which is governed by the selected angular orientation of the appendage 26.

As can be seen in FIG. 9, the projectile 6 passes through the lateral opening 11 of the module 8, and it is also noteworthy that, at the same time as the projectile exits the cradle, the retention ring 54 of the tail-fins 9 separates from the radial spindle 55 protruding from the base of the cradle 20.

In this way, owing to the action of the spring 57 acting on the pin 59, the ring 54 rotates angularly relative to the rear part 46 of the projectile until the openings 56 are simultaneously aligned with the slots 53 for receiving the tail-fin vanes 9. Owing to the resilient action of the springs associated with the tail-fin hinges (not shown) said tail-fins change, in a spontaneous and synchronised manner, from their folded position to their deployed position, as shown in FIG. 9. This occurs practically as soon as the projectile is launched from the module. These same springs hold the tail-fins in the deployed position.

Therefore, owing to the arrangement of the tubes of the system 2 parallel to the longitudinal axis A of the aeroplane 1 and by the module 8 with the lateral opening, the projectile 6 (and subsequently all of the other projectiles) is ejected perpendicular to the axis A whilst having the axis C of the body 80 parallel thereto. The projectile is then oriented correctly and directly in the direction of the aerodynamic slipstream F, which with the tail-fins deployed ensures that it has rapid and secure stabilisation in the slipstream with minimum drag. The ejected kinematic projectile 6 thus achieves optimum quality of flight and is therefore capable of fulfilling its counter-measure role to decoy the detected threat.

Once the projectile is ejected, the support cradle 20 that remained in the axial passage 12 is also ejected. In order to achieve this, the mechanism 7 with a piston 60 is activated, which causes the series of aligned cradles 20 to slide inside the tube 5 towards the module 8. The empty cradle passes through the corresponding cut-out 45 of the downstream transverse side 16 of the module and pushes open the trapdoor 19, as shown by the dashed line in FIG. 9. This occurs until the next cradle 20 and its projectile are fully housed in the free axial passage 12 of the module, with the projectile coming into axial abutment against the transverse side of the body 10.

A further firing with the next projectile 6 in the same tube 5 or in the other parallel tube using a different (or not different) counter-measure device 81 can then be triggered, still from the same module, which acts as a common firing interface for the stored projectiles. All of the projectiles can be successively fired so as to effectively counter the different threats and to protect the aeroplane from said threats.

The invention claimed is:

1. Counter-measure decoy system designed to be installed on an aircraft comprising:
   counter-measure projectiles (6);
   at least one tube (5) receiving said counter-measure projectiles in series and for successive controllable launching of said counter-measure projectiles; and
   a control mechanism (7) for advancing said projectiles inside said tube, wherein: said counter-measure projectiles (6) respectively comprise dimensionally identical external cylindrical bodies (80), housed inside said tube and each having a deployable-tail-fin aerodynamic stabilization device (9), which tail-fins assume a folded position inside the body when said counter-measure projectiles are inside said tube, and a deployed position outside of said tube,
   said system comprises a projectile ejection module (8), with an axial passage (12), fixedly arranged in as an extension of said tube, opposite said control mechanism, and successively containing, after said control mechanism, said counter-measure projectiles (6) to be ejected from said tube by a controllable ejection device (25) connected to said module;
   wherein the counter-measure projectiles (6) are ejected through a lateral opening (11) in said module (8).

2. System according to claim 1, wherein said counter-measure projectiles (6) with cylindrical bodies (80) housed inside said tube and said module have counter-measure devices (81) that are identical or different for at least two of said projectiles.

3. System according to claim 1 wherein a counter-measure device (81) of at least one of said counter-measure projectiles is an active electromagnetic counter-measure device.

4. System according to claim 1, wherein a counter-measure device (81) of at least one of said counter-measure projectiles is an infrared counter-measure device.

5. System according to claim 1, wherein at least one of said counter-measure projectiles (6) is equipped with a propulsion unit (82) housed inside said body.

6. System according to claim 1, wherein said tube (5) is at least arranged approximately parallel to the longitudinal axis of the aircraft.

7. System according to claim 1, wherein each of the counter-measure projectiles (6) is mounted in a respective support cradle, wherein each of said counter-measure projectiles is ejected from a lateral opening in said respective support cradle by the controllable ejection device.

8. System according to claim 1, wherein the deployable-tail-fin aerodynamic stabilisation device (9) of each counter-measure projectiles faces the projectile ejection module (8) and a front of each counter-measure projectile faces said control mechanism.

9. System according to claim 1, wherein each of said counter-measure projectiles (6) with external cylindrical bodies are mounted in respective, identical support cradles (20), which are housed inside said tube and laterally open, and said ejection module (8) with an axial passage (12) for receiving said cradle which carries an associated counter-measure projectile has a lateral opening (11) through which said counter-measure projectiles are ejected from its cradle by said ejection device (25).

10. System according to claim 9, wherein in addition to the relevant counter-measure device (81) and the deployable tail-fins (9) downstream of said body, a chamber (34) associated with said device (25) for ejecting from said cradle, a locking mechanism (35) between said body and said cradle and an electrical connector (62, 63) for firing orders and other operating data are located inside said cylindrical body (80) common to each projectile.

11. System according to claim 9, wherein said device (25) for ejecting each counter-measure projectile is of a pyrotechnic type and is arranged in either the cradle or the counter measure projectiles in order to radially eject said projectiles through said lateral opening (11) of said module (8).

12. System according to claim 9, wherein that position retention means are provided between said cradle (20) and said ejection module (8), with axial and transverse immobilisation of said cradle in relation to said module.

13. System according to claim 12, wherein said vanes (9) are housed inside lateral slots (53) of said cylindrical body (80) and are held in a folded position inside said cradle by a rotary ring (54) connected to said body and surrounding said tail-fin vanes and, following the ejection of one of said counter-measure projectiles and under the action of a resilient element (57), said ring rotates in order to locate its lateral openings (56) opposite said slots (53) and to cause said tail-fins to move from the folded position to the deployed position.

14. System according to claim 1, wherein said deployable tail-fins (9) of said counter-measure projectiles are in the form of at least two vanes.

15. Counter-measure decoy system designed to be installed on an aircraft comprising:
   counter-measure projectiles (6);
   at least one tube (5) for receiving said counter-measure projectiles in series and for successive controllable launching of said counter-measure projectiles; and
   a control mechanism (7) for advancing said projectiles inside said tube, wherein:
   said counter-measure projectiles (6) respectively comprise dimensionally identical external cylindrical bodies (80), housed inside said tube and each having a deployable-tail-fin aerodynamic stabilisation device (9), which tail-fins assume a folded position inside the body when said counter-measure projectiles are inside said tube, and a deployed position outside of said tube, and said system comprises a projectile ejection module (8), with an axial passage (12), fixedly arranged as an extension of said tube, opposite said control mechanism, and successively containing, after said control mechanism, said counter-measure projectiles (6) to be ejected from said tube by a controllable ejection device (25) connected to said module, wherein each of said counter-measure projectiles (6) with external cylindrical bodies are mounted in respective, identical support cradles (20), which are housed inside said tube and laterally open, and said ejection module (8) with an axial passage (12) for receiving said cradle which carries said associated counter-measure projectile has a lateral opening (11) through which said counter-measure projectile is ejected from its cradle by said ejection device (25).

16. System according to claim 15, wherein in addition to respective counter-measure devices (81) and the deployable tail-fins (9) downstream of said body, a chamber (34) associated with said controllable ejection device (25) for ejecting from said cradle, a locking mechanism (35) between said body and said cradle of one of said counter-measure projectiles and an electrical connector (62, 63) for the firing orders and other operating data are located inside said cylindrical body (80) common to each projectile.

17. System according to claim 15, wherein said controllable ejection device (25) for ejecting each counter-measure projectile is a pyrotechnic ejection device and is arranged in either the cradle or the counter-measure projectile in order to radially eject said projectile through said lateral opening (11) of said module (8).

18. Counter-measure decoy system designed to be installed on an aircraft comprising:
  counter-measure projectiles (6);
  at least one tube (5) for receiving said counter-measure projectiles in series and for successive controllable launching of said counter-measure projectiles; and
  a control mechanism (7) for advancing said projectiles inside said tube, wherein:
  said counter-measure projectiles (6) respectively comprise dimensionally identical external cylindrical bodies (80), housed inside said tube and each having a deployable-tail-fin aerodynamic stabilisation device (9), which tail-fins assume a folded position inside the body when said counter-measure projectiles are inside said tube, and a deployed position outside of said tube, and
  said system comprises a projectile ejection module (8), with an axial passage (12), fixedly arranged as an extension of said tube, opposite said control mechanism, and successively containing, after said control mechanism, said counter-measure projectiles (6) to be ejected from said tube by a controllable ejection device (25) connected to said module, wherein said deployable tail-fins (9) of said counter-measure projectiles are in the form of at least two vanes, and
  wherein said vanes (9) are housed inside lateral slots (53) of said cylindrical body (80) and are held in a folded position inside said cradle by a rotary ring (54) connected to said body and surrounding said tail-fin vanes and, following the ejection of one of said counter-measure projectiles and under the action of a resilient element (57), said ring rotates in order to locate its lateral openings (56) opposite said slots (53) and to cause said tail-fins to move from the folded position to the deployed position.

19. System according to claim 15, wherein position retention means are provided between said cradle (20) and said ejection module (8), with axial and transverse immobilisation of said cradle in relation to said module.

* * * * *